(12) United States Patent
Biskeborn et al.

(10) Patent No.: US 7,609,475 B2
(45) Date of Patent: Oct. 27, 2009

(54) TAPE GUIDE SYSTEM AND TAPE DRIVE SYSTEM IMPLEMENTING SAME

(75) Inventors: Robert Glenn Biskeborn, Hollister, CA (US); Wayne Isami Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/463,223

(22) Filed: Aug. 8, 2006

(65) Prior Publication Data
US 2008/0037159 A1    Feb. 14, 2008

(51) Int. Cl.
*G11B 5/027* (2006.01)
(52) U.S. Cl. .......................................... 360/85
(58) Field of Classification Search .................. 360/85, 360/92, 96.1, 96.2, 96.3, 96.4, 711, 137, 360/130.32, 130.24, 130.22; 242/347.1
See application file for complete search history.

(56) References Cited
U.S. PATENT DOCUMENTS

| | | | | | |
|---|---|---|---|---|---|
| 4,249,222 | A | * | 2/1981 | Iwasaki | 360/130.23 |
| 4,309,728 | A | * | 1/1982 | Takizawa et al. | 360/71 |
| 5,321,566 | A | * | 6/1994 | Grant et al. | 360/85 |
| 5,982,576 | A | * | 11/1999 | Rudi | 360/96.1 |
| 6,043,953 | A | * | 3/2000 | Spears et al. | 360/96.1 |
| 6,104,580 | A | * | 8/2000 | Yoshiya et al. | 360/137 |
| 2007/0236827 | A1 | * | 10/2007 | Eaton et al. | 360/93 |

\* cited by examiner

*Primary Examiner*—Allen T Cao
(74) *Attorney, Agent, or Firm*—Zilka-Kotab, PC

(57) ABSTRACT

A tape guide assembly and tape drive system including the same comprise a roller guide adapted for engaging a tape wrapped around at least a portion of an outer surface thereof; and at least one support for lifting the tape from the roller guide.

20 Claims, 4 Drawing Sheets

TAPE GUIDE SYSTEM AND TAPE DRIVE SYSTEM IMPLEMENTING SAME

FIELD OF THE INVENTION

The present invention relates to tape drive systems, and more particularly, this invention relates to a tape guide system for tape drive systems.

BACKGROUND OF THE INVENTION

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

FIG. 1 illustrates a traditional flat-lapped bi-directional, two-module magnetic tape head 100, in accordance with the prior art. As shown, the head includes a pair of bases 102, each equipped with a module 104. The bases are typically ceramic beams shaped in the form of a U that are adhesively coupled together. Each module 104 includes a substrate 104A and a closure 104B with readers and/or writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Two common parameters are associated with heads of such design. One parameter includes the tape wrap angles $\alpha_i$, $\alpha_o$, defined between the tape 108 and a plane 111 in which the upper surface of the tape bearing surface 109 resides. It should be noted that the tape wrap angles $\alpha_i$, $\alpha_o$ includes an inner wrap angle $\alpha_i$ which is often similar in degree to an external, or outer, wrap angle $\alpha_o$. The tape bearing surfaces 109 of the modules 104 are set at a predetermined angle from each other such that the desired inner wrap angle $\alpha_i$ is achieved at the facing edges. The wrap angles $\alpha_i$, $\alpha_o$, and tape bearing surface length 112 are often adjusted to deal with various operational aspects of heads such as that of FIG. 1.

The external wrap angles $\alpha_o$ are typically set in the drive, such as by adjustable eccentric-axle rollers. The offset axis creates an orbital arc of rotation, allowing precise alignment of the wrap angle $\alpha_o$. However, situations arise where rollers may not be the most desirable choice to set the external wrap angles $\alpha_o$. For example, rollers require extra headroom in a drive, particularly where they are adjustable. Additionally, rollers, and particularly adjustable roller systems, may be more expensive to install in the drive. A further drawback of this approach is mechanical alignment cannot be completed independent of signal read readiness.

FIG. 2 illustrates one proposed solution to set the desired external wrap angles $\alpha_o$, and which may be less expensive than implementing adjustable rollers. The proposed solution comprises forming outriggers 150 on the module 104, as shown in FIG. 2. The outriggers 150 set the external wrap angles $\alpha_o$. However, as the fabrication of tape head components moves towards use of thinner wafers, the distance between the front and back faces of the module 104 is reduced. When outriggers 150 are used, a minimum free space span between the outrigger inner edge 152 and the outer edge 154 of the primary tape bearing surface 109 is required so as not to disrupt the aforementioned tape effects, namely tenting. Particularly, in a flat-profile tape head (as shown), the elements 106 are positioned between the substrate 104A and a closure 104B. The primary tape bearing surface 109 needs to be long enough in the direction of tape travel so that tenting does not occur over the elements 106, because reliability of the read/write functions depends in part on the tape-head spacing.

One problem associated with the systems described above is that they are susceptible to sporadic tape lateral motion jumps. These motion jumps are believed to be caused by lateral shifts of the tape as it wraps around the spool in the tape cartridge. Air between the tape wraps effectively acts as a lubricant, which allows the tape to shift laterally one way or the other as it is wrapping onto a reel.

The back coat of the tape is intentionally not as smooth as the front coat to help the tape roll up on the reel without excess air build up between wraps on the reel. The rougher back coat allows the air to bleed out between the surface features as well as enhances friction between the rolls of tape on the reel. However, some air may remain, allowing the tape to shift as it rolls onto the spool.

These shifts create problems when the tape is despooling, namely that the angle of approach of the tape as it enters the guide system changes. The resultant lateral motion of the tape causes tape shift and skew, which in turn can cause misregistration between head and tape. For instance, as the tape unwraps, any lateral shifting in the tape wrap translates through the guide assembly and causes a corresponding motion jump of the tape relative to the head that the actuator may not perfectly track.

Tape lateral motion hops also put a lower bound on stop write thresholds, and so ultimately on track density. The only known solution to this problem is to have the head inserted between the tape and a large roller guide. This has the drawback that there is very little space to fit the head, cables and actuator. The compromises add complexity and cost to head design and build. A solution is needed that has the same advantages, but removes the space restrictions.

SUMMARY OF THE INVENTION

A tape guide assembly according to one embodiment of the present invention includes a roller guide adapted for engaging a tape wrapped around at least a portion of an outer surface thereof, and at least one support for lifting the tape from the roller guide.

A tape drive system according to one embodiment of the present invention includes a head, and a drive mechanism for passing a magnetic recording tape over the head. The drive mechanism includes tape guide assembly described above. A controller is in communication with the head. An actuator may or may not be present for positioning the head relative to the roller guide.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention as well as the preferred mode of use, reference should be made to the following detailed description read in conjunction with the accompanying drawings.

Prior Art

Prior Art

BEST MODE FOR CARRYING OUT THE INVENTION

Figure 1:
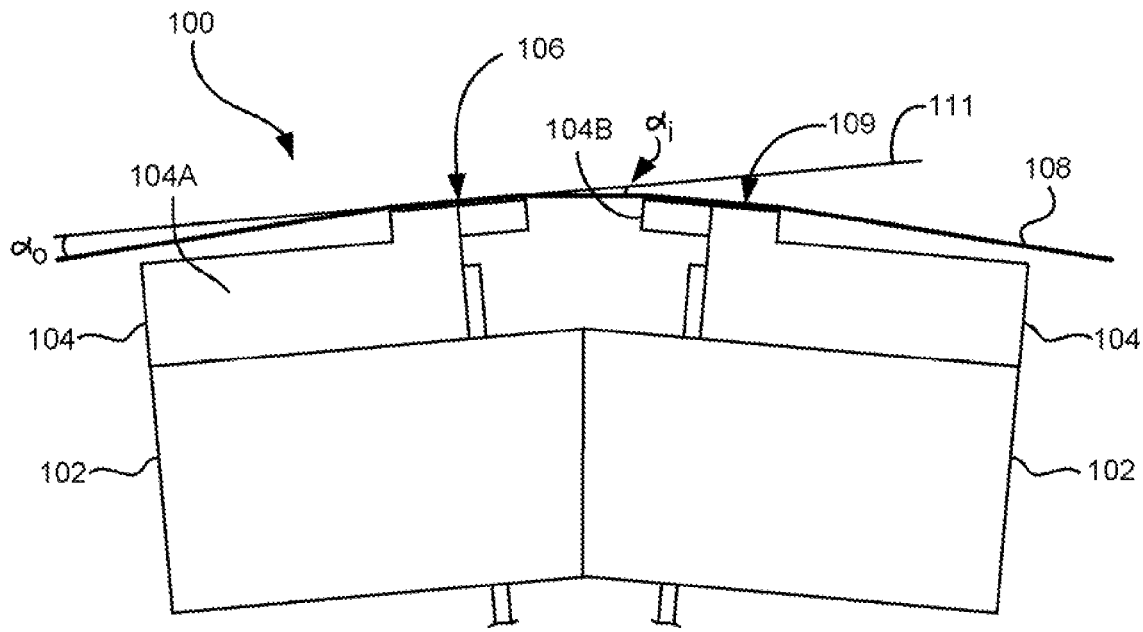
FIG. 1 illustrates a traditional flat-lapped magnetic tape head, in accordance with the prior art.
Figure 2:
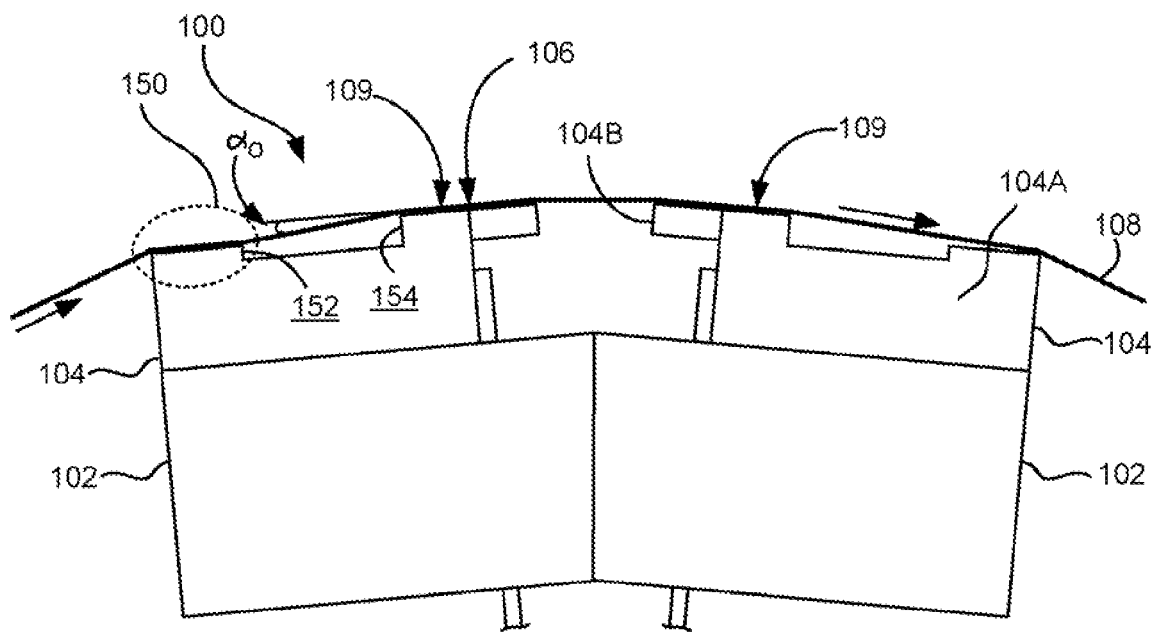
FIG. 2 is a side view of a magnetic tape head with outriggers.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each and any of the various possible combinations and permutations.

In the drawings like and equivalent elements are numbered the same throughout the various figures.

The embodiments described below disclose a new tape guide assembly used in conjunction with single or multiple tape supports. This invention eliminates the space restrictions of the conventional approach and so enables low cost and simpler head fabrication, and at the same time effectively reduces the amplitude of sporadic lateral transients.

Figure 3:
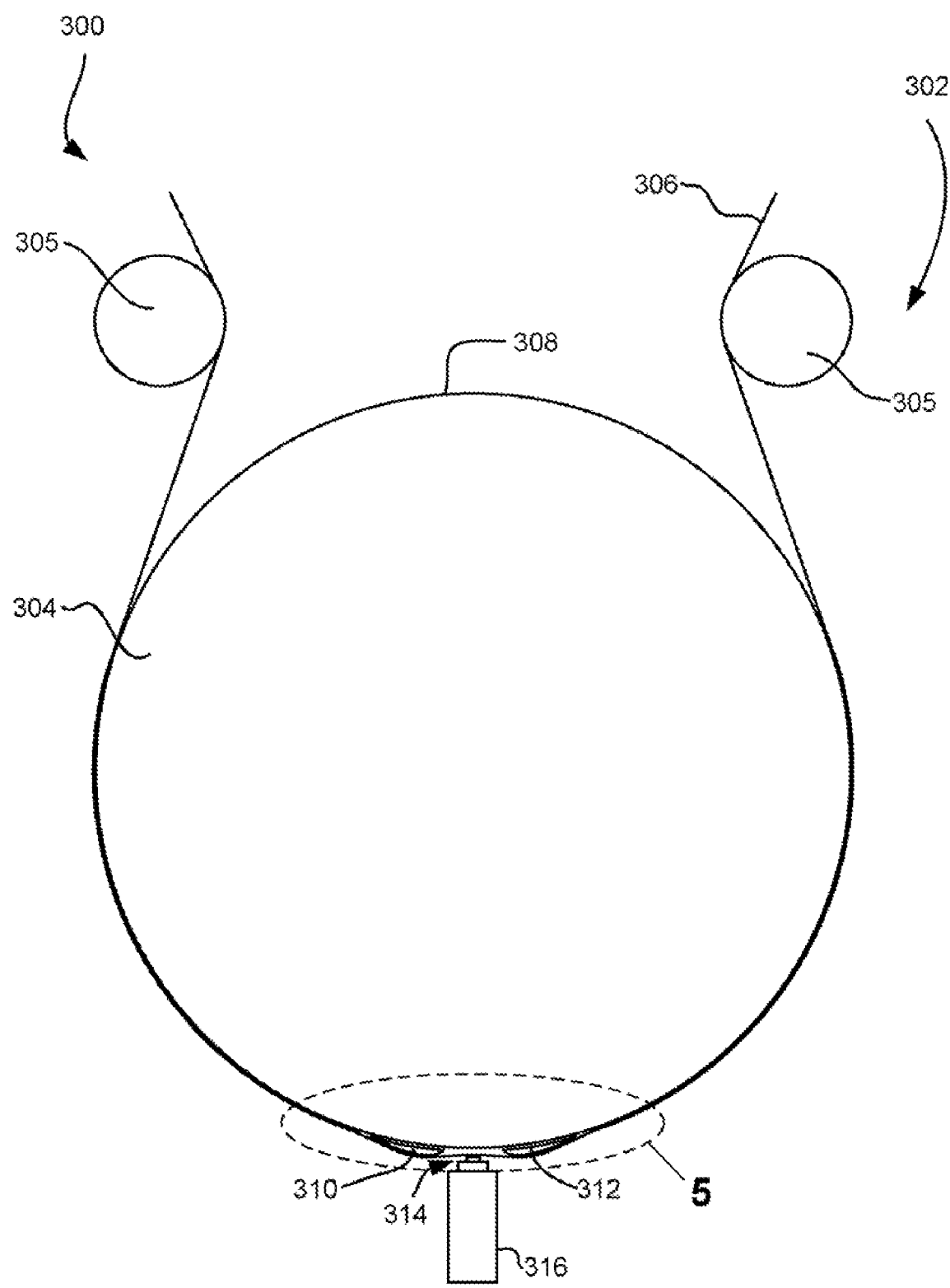
FIG. 3 is a schematic diagram of a tape drive system according to one embodiment of the present invention.

FIG. 3 illustrates a portion of a drive mechanism for a tape drive system 300 according to one embodiment of the present invention. As shown, the drive mechanism includes a tape guide assembly 302. The tape guide assembly 302 includes a roller guide 304 and optional secondary guides 305. The tape 306 is wrapped around at least a portion of the roller guide's outer surface 308. One or more supports 310, 312 lift the tape 306 from the roller guide. In the embodiment shown, the supports oppose each other, lifting the tape 306 away from the roller guide in the vicinity of the head 314. The head is shown mounted conventionally, if desired, on an actuator 316.

Figure 5:
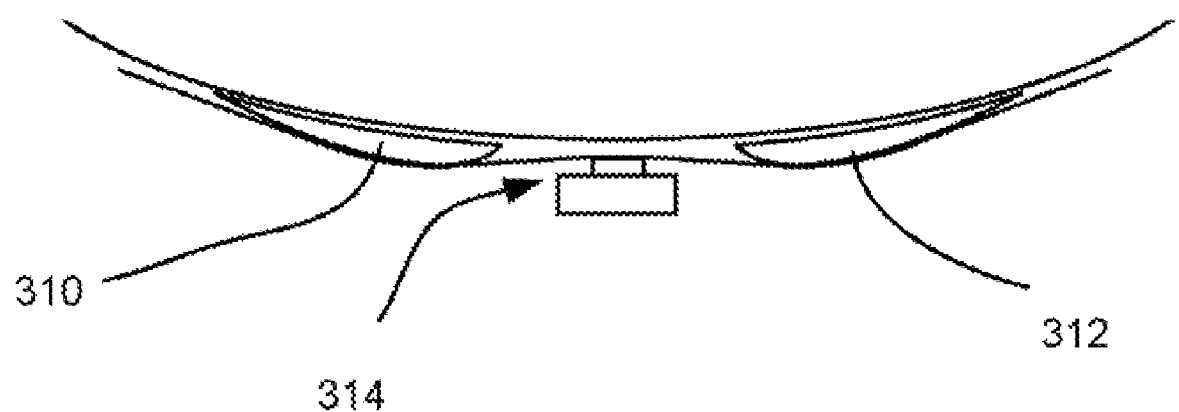
FIG. 5 is a detail diagram taken from Circle 5 of FIG. 3.

In use, the tape 306 is threaded around the roller guide 304 and the supports 310, 312. Suitable threading mechanisms are known in the art, and may include or be a variant of the threading mechanisms such as those used in Video Cassette Recorder (VCR) machines or Linear Tape Open (LTO) machines. The head 314 is placed in contact with the tape 306 at a desired depth in order to achieve about a preferred wrap angle of the tape 306 relative to the head 314. In preferred embodiments, the head 314 contacts the data surface in the short span adjacent the support (in a single support embodiment) or between the supports 310, 312 (as shown). See also FIG. 5. With continued reference to FIG. 3, the wrap angle may be set by adjusting the amount of head penetration or insertion relative to the supports 310, 312. Alternatively, the wrap angle may be set by adjusting the position of the supports 310, 312 relative to the head 314. In yet another embodiment, a combination of adjustable head and supports 310, 312 may be used to set the wrap angle.

As the roller guide 304 rotates, the backside of the tape 306 contacts the roller guide 304 and the tape 306 is carried across the head 314. As noted above, tape skew during reading or writing is undesirable. The present invention minimizes tape lateral motion because the tape 306 is anchored down to the roller guide 304. This in turn reduces skew.

The outer surface of the roller guide 304 may be textured. This enhances the sliding friction between tape 306 and roller guide 304, which is important for limiting sporadic and other lateral transients. In one embodiment, the outer surface of the roller guide 304 has grooves extending circumferentially therealong. Other illustrative texturing include cross hatching, raised regions, etc. The texturing, can be uniform or nonuniform along the outer surface of the roller guide 304.

As mentioned above, the back coat of the tape 306 is typically intentionally made rough to help it roll up on the reel without excess air build up between wraps on the reel. This roughness also enhances the anchoring of the tape 306 to the roller guide 304.

The supports 310, 312 are mounted very close to, or optionally in contact with, the associated roller guide 304. The supports 310, 312 are preferably rigid, smooth and properly contoured and accurately positioned relative to the roller guide 304.

The supports 310, 312 may have any of various shapes. For example, the supports 310, 312 may have a rounded shape profile, e.g. such as a semicircle, or more preferably, having a shape about conforming to a portion of a Cornu spiral, as shown. Such shapes are believed to minimize tape-induced wear.

In a preferred embodiment, the supports 310, 312 have a shape profile that enables an air bearing to form between the supports 310, 312 and the tape 306 to eliminate wear due to streaming tape. To further minimize wear, the supports 310, 312 may be constructed of a hard, wear resistant ceramic, such as AlTiC. Other suitable materials include hard metals such as stainless steel, etc.

In embodiments where the supports are rounded, the smaller the radius of curvature of the supports 310, 312, the more likely the tape 306 is to come into rubbing contact on the supports. Thus, a preferred minimum radius of the supports 310, 312 is about 5 mm for a tape having a thickness of about 5-25 microns.

A short span between the supports 310, 312 is preferred, as a short span tends to minimize flutter and other periodic and aperiodic disturbances of the tape 306 relative to the head 314. An illustrative span is between about 0.5 and about 10 mm.

The tape bearing surface of the head 314 faces the roller guide 304. Because the tape 306 is positioned between the head 314 and roller guide 304, there is plenty of room for the head, cables, etc.

The design of the head 314 is not critical. For instance, the head 314 can have a flat tape bearing surface, rounded tape bearing surface, and combinations thereof. For a head having a flat contour tape bearing surface, an illustrative wrap angle of the tape relative to the tape bearing surface is between about 0.8 and about 1.0 degrees.

The actuator 316 can be any type of actuator. For example, the actuator 316 may include a coarse actuator, a fine actuator, or both. The head/actuator assembly pivots down in the drawing to enable loading and unloading of the tape 306.

One skilled in the art will appreciate that the dimensions given above and other places herein are presented by way of example only and can be made larger or smaller per the design and fabrication constraints, performance considerations, etc.

Any of the above embodiments or combinations of portions thereof can also be applied to any type of tape head and magnetic tape recording systems, both known and yet to be invented. For example, the teachings herein are easily adaptable to interleaved heads, which typically include opposing modules each having an array of alternating readers and writers configured to provide read-while-write capability.

Figure 4:
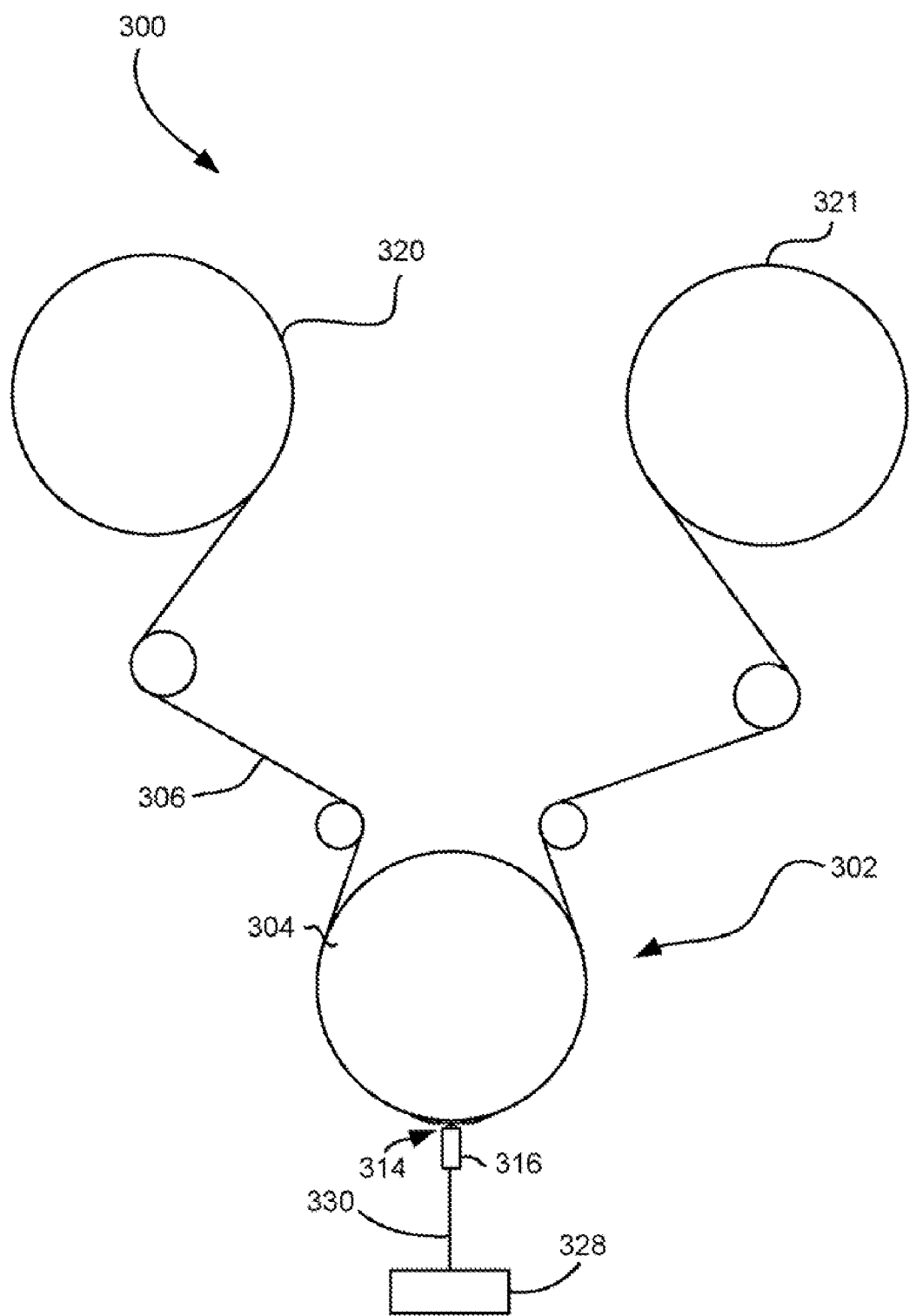
FIG. 4 is a schematic diagram of a tape drive system according to one embodiment of the present invention.

FIG. 4 illustrates a simplified tape drive system 300 which be employed in the context of the present invention. While one specific implementation of a tape drive system is shown in FIG. 4, it should be noted that the embodiments of the previous figures may be implemented in the context of any type of tape drive system.

As shown, a tape supply reel 320 and a take-up reel 321 are provided to support a tape 306. These may form part of a removable cassette and are not necessarily part of the system. A guide assembly 302 guides the tape 306 across a preferably bidirectional tape head 314. Such tape head 314 is in turn coupled to a controller assembly 328 via a connector cable 330. The controller 328, in turn, controls head functions such as servo following, write bursts, read functions, etc. An actuator 316 controls position of the head 314 relative to the tape 306, and may operate under control of the controller.

A tape drive, such as that illustrated in FIG. 4, includes drive motor(s) to drive the take-up reel 321, and optionally, tape supply reel 320 and roller guide 304, to move the tape 306 linearly over the head 314. The tape drive system 300 also includes a read/write channel to transmit data to the head 314 to be recorded on the tape 306 and to receive data read by the head 314 from the tape 306. An interface is also provided for communication between the tape drive system and a host (integral or external) to send and receive the data and for controlling the operation of the tape drive and communicating the status of the tape drive to the host, all as will be understood by those of skill in the art.

While various embodiments have been described above, it should be understood that they, have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape guide assembly, comprising:
a roller guide adapted for engaging a tape wrapped around at least a portion of an outer surface thereof; and
at least one support for lifting the tape from the roller guide, wherein the tape engages the outer surface of the roller guide on both sides of the support when wrapped around the roller guide.

2. A tape guide assembly, comprising:
a roller guide adapted for engaging a tape wrapped around at least a portion of an outer surface thereof; and
at least one support for lifting the tape from the roller guide, wherein an outer surface of the roller guide is textured.

3. The tape guide assembly as recited in claim 2, wherein the at least one support has a rounded shape.

4. The tape guide assembly as recited in claim 3, wherein the at least one support has a shape about conforming to a portion of a Cornu spiral.

5. The tape guide assembly as recited in claim 2, wherein the outer surface of the roller guide has grooves extending circumferentially therealong.

6. The tape guide assembly as recited in claim 2, wherein the at least one support has a shape that allows an air bearing to be formed between the support and a tape passing over the support.

7. A tape drive system, comprising:
a head;
a drive mechanism for passing a magnetic recording tape over the head, the drive mechanism including:
a roller guide, the tape being at least partially wrapped around the roller guide; and
at least one support for lifting the tape from the roller guide in the vicinity of the head, wherein the tape engages the roller guide on opposite sides of the head when wrapped around the roller guide; and
a controller in communication with the head.

8. A tape drive system, comprising:
a head;
a drive mechanism for passing a magnetic recording tape over the head, the drive mechanism including;
a roller guide, the tape being at least partially wrapped around the roller guide; and
at least one support for lifting the tape from the roller guide in the vicinity of the head; and
a controller in communication with the head,
wherein an outer surface of the roller guide is textured.

9. The tape drive system as recited in claim 8, wherein the head has a flat contour tape bearing surface.

10. The tape drive system as recited in claim 8, wherein a tape bearing surface of the head faces the roller guide.

11. The tape drive system as recited in claim 10, wherein the head engages the tape between the supports, wherein a wrap angle of the tape relative to a tape bearing surface of the head is determined by an extent of insertion of the head between the supports.

12. The tape drive system as recited in claim 8, wherein the at least one support has a rounded shape.

13. The tape drive system as recited in claim 8, wherein the at least one support has a shape that allows an air bearing to be formed between the support and a tape passing over the support.

14. A tape drive system, comprising:
a head;
a drive mechanism for passing a magnetic recording tape over the head, the drive mechanism including;
a roller guide, the tape being at least partially wrapped around the roller guide; and
opposing supports for lifting the tape from the roller guide in the vicinity of the head, the head engaging the tape between the supports,
wherein the tape engages the roller guide towards outer sides of the opposing supports when wrapped around the roller guide;
an actuator for positioning the head relative to the roller guide; and
a controller in communication with the head.

15. A tape drive system, comprising:
a head;
a drive mechanism for passing a magnetic recording tape over the head, the drive mechanism including;
a roller guide, the tape being at least partially wrapped around the roller guide; and
opposing supports for lifting the tape from the roller guide in the vicinity of the head, the head engaging the tape between the supports;
an actuator for positioning the head relative to the roller guide; and
a controller in communication with the head,
wherein an outer surface of the roller guide is textured.

16. The tape drive system as recited in claim 15, wherein the head has a flat contour tape bearing surface.

17. The tape drive system as recited in claim 15, wherein a tape bearing surface of the head faces the roller guide.

18. The tape drive system as recited in claim 17, wherein a wrap angle of the tape relative to a tape bearing surface of the head is determined by an extent of insertion of the head between the supports.

19. The tape drive system as recited in claim 15, wherein each support has a rounded shape.

20. The tape drive system as recited in claim 15, wherein each support has a shape that allows an air bearing to be formed between the support and a tape passing over the support.

* * * * *